United States Patent
Zeniya et al.

(10) Patent No.: US 10,162,335 B2
(45) Date of Patent: Dec. 25, 2018

(54) NUMERICAL CONTROLLER CAPABLE OF NEIGHBORING POINT SEARCH WITH CONSIDERATION FOR TOOL ATTITUDE

(71) Applicant: FANUC Corporation, Minamitsuru-gun, Yamanashi (JP)

(72) Inventors: Shintarou Zeniya, Minamitsuru-gun (JP); Takeshi Mochida, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 283 days.

(21) Appl. No.: 15/001,282

(22) Filed: Jan. 20, 2016

(65) Prior Publication Data

US 2016/0224007 A1 Aug. 4, 2016

(30) Foreign Application Priority Data

Jan. 30, 2015 (JP) .................................. 2015-016338

(51) Int. Cl.
*G05B 19/402* (2006.01)
*G05B 19/4067* (2006.01)

(52) U.S. Cl.
CPC ............ *G05B 19/4067* (2013.01); *G05B 2219/50097* (2013.01); *G05B 2219/50098* (2013.01); *G05B 2219/50353* (2013.01)

(58) Field of Classification Search
CPC ............. G05B 19/41; G05B 2219/50353
See application file for complete search history.

(56) References Cited

U.S. PATENT DOCUMENTS

2007/0046677 A1* 3/2007 Hong ................... G05B 19/41
 345/442
2007/0106407 A1* 5/2007 Drumheller .......... B29C 70/386
 700/96

(Continued)

FOREIGN PATENT DOCUMENTS

CN 101403907 A 4/2009
CN 101493682 A 7/2009

(Continued)

OTHER PUBLICATIONS

Decision to Grant a Patent issued Nov. 22, 2016 in Japanese Patent Application No. 2015-016338 (3 pages) with an English Translation (3 pages).

(Continued)

*Primary Examiner* — Raj R Gupta
(74) *Attorney, Agent, or Firm* — Drinker Biddle & Reath LLP

(57) ABSTRACT

A numerical controller includes a neighboring point search function that moves a tool controlled by a moving axis and a rotation axis onto a machining path directed by a machining program within the range of a neighboring point distance from a current position of the tool. When searching the neighboring point, the numerical controller determines a neighboring point with consideration for both a tool center point position and a tool attitude. By employing this search method, even when a plurality of block start points are present in the neighboring point distance from the current tool position, a block start point of the block originally desired to be restarted can be determined as a neighboring point.

3 Claims, 8 Drawing Sheets

(56) References Cited

U.S. PATENT DOCUMENTS

2009/0125142 A1* 5/2009 Bauer ..................... B24B 5/00
                                                                                          700/164
2009/0187276 A1   7/2009 Nagatsuka et al.
2013/0338816 A1  12/2013 Tezuka et al.

FOREIGN PATENT DOCUMENTS

| JP | H04-11211 A | 4/1992 |
|---|---|---|
| JP | H06-242817 A | 9/1994 |
| JP | H09-128027 A | 5/1997 |
| JP | 2013-257809 A | 12/2003 |

OTHER PUBLICATIONS

Chinese Office Action dated Oct. 30, 2017 that issued in Chinese Patent Application No. 2016100691899, along with its English-language translation attached.

* cited by examiner

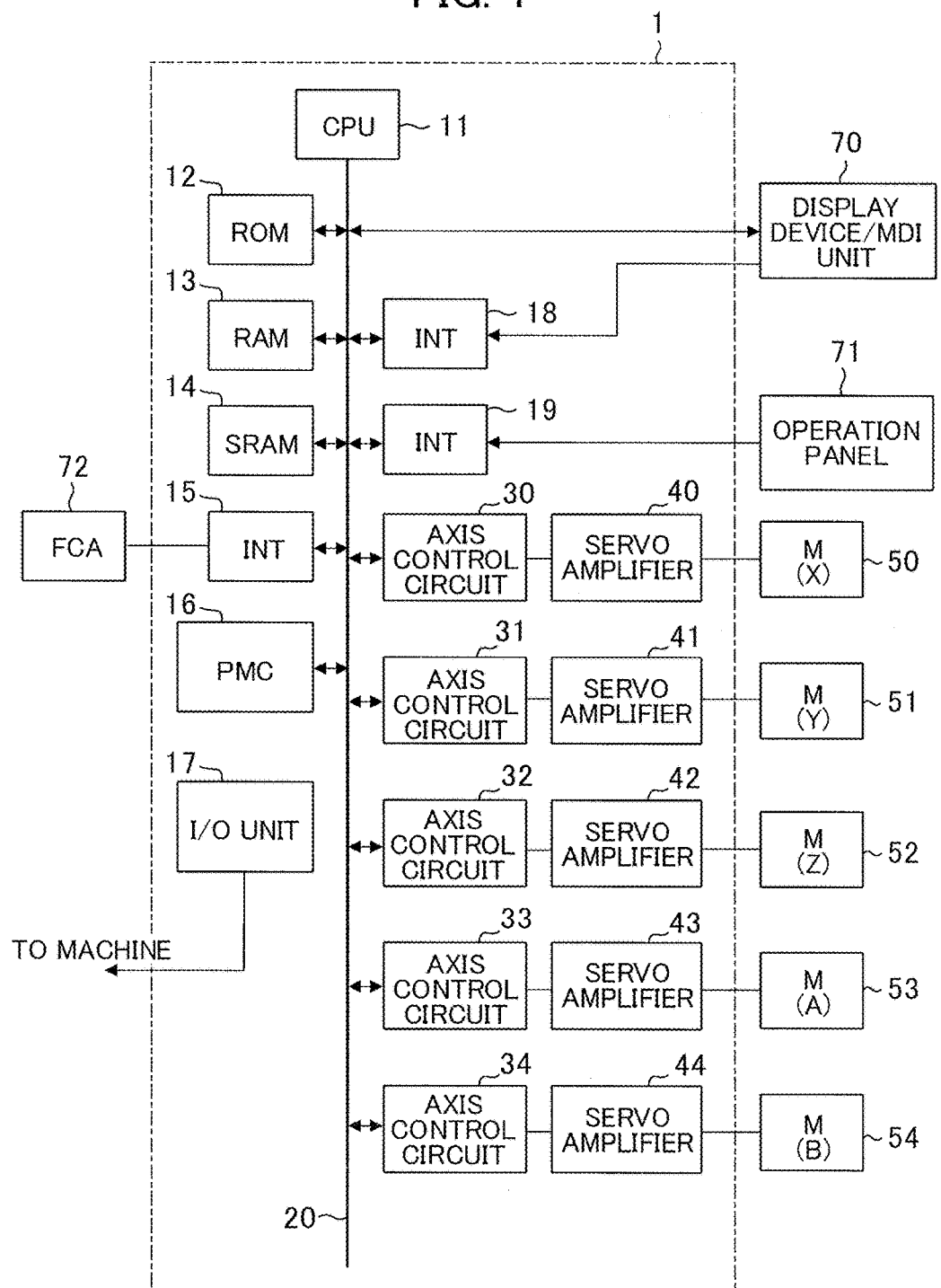

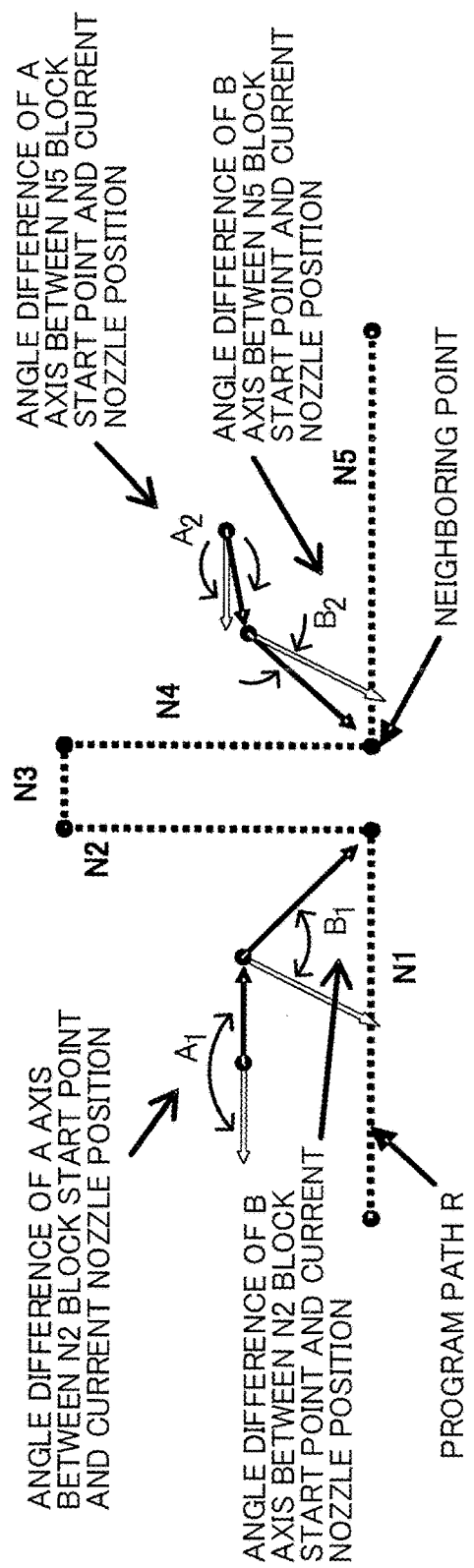

NUMERICAL CONTROLLER CAPABLE OF NEIGHBORING POINT SEARCH WITH CONSIDERATION FOR TOOL ATTITUDE

RELATED APPLICATION DATA

This application claims priority under 35 U.S.C. § 119 and/or § 365 to Japanese Application No. 2015-016338 filed Jan. 30, 2015, the entire contents is incorporated herein by reference.

BACKGROUND OF THE INVENTION

1. Field of the Invention

The present invention relates to a numerical controller, in particular, a numerical controller capable of neighboring point search with consideration for an attitude of a tool.

2. Description of the Related Art

When a neighboring point search function is executed, a machining program is temporarily executed from the start, and the distance between two points of a current tool center point and a tool center point at each of block start points of blocks being temporarily executed is calculated. When this distance falls within the range of a set distance (neighboring point distance) and the tool center point further moves away from the current tool center point at the block end point of that block, this block start point is set as a neighboring point. When the neighboring point is determined, the tool is positioned at the neighboring point, enabling restart of the program from the block start point.

FIG. 6 (a nozzle for laser machining is taken as an example of the tool) illustrates a determination of a neighboring point using a neighboring point search function and a positioning for restart of the program under search. A block start point present within the range of a neighboring point distance from a tool center point is set as the neighboring point, and it is possible that the program is restarted in the same manner as when the program is executed to the block start point and then suspended.

As a prior art technique related to a determination of the shortest neighboring point on a machining path, a technique is known that selects, out of blocks in a machining program, a block in which a machining path passes within the range of a set distance and the distance to a current position of the tool is the shortest (for example, Japanese Patent Application Laid-Open No. 9-128027).

A neighboring point search function according to a prior art technique determines a neighboring point only with the distance between a tool center point in each block when a machining program is temporarily executed from the start and an actual tool center point. For this reason, when an attitude of the tool is changed but the movement of the tip thereof is small in three-dimensional machining and a plurality of block start points are present within a range of a neighboring point distance from the current tool position, for example, there has been a problem that a block start point that is not of the block originally desired to be restarted is set as a neighboring point in some cases.

For example, as illustrated in FIG. 7 (a nozzle for laser machining is taken as an example of the tool), some programs may cause a problem that a block start point, that is different from the block start point to which a tool tip is brought close in an attempt to restart the program, enters first the range of a neighboring point distance, with the result that this block start point may be determined as a neighboring point.

SUMMARY OF THE INVENTION

The object of the present invention is to provide a numerical controller having a neighboring point search function capable of setting a more suitable block start point as a neighboring point in machining with a plurality of block start points present within the range of a neighboring point distance.

A numerical controller according to the present invention includes a neighboring point search function that moves a tool controlled by at least one moving axis and at least one rotation axis based on a machining program and, when a point present in a predetermined distance preset as a neighboring point distance from a current position of the tool and on a machining path directed by the machining program is defined as a neighboring point, moves the tool to the neighboring point to restart the machining program from the neighboring point. The numerical controller includes a current tool center point position acquisition unit, a current tool attitude acquisition unit, a machining program analysis unit, a block execution start time tool center point position acquisition unit, a distance neighborhood determination unit, a block execution start time tool attitude acquisition unit, an attitude neighborhood determination unit, and a neighboring point output unit. The current tool center point position acquisition unit acquires a current tool center point position of the tool. The current tool attitude acquisition unit acquires a current tool attitude of the tool. The machining program analysis unit reads a block from the machining program and analyzes the read block. The block execution start time tool center point position acquisition unit acquires a tool center point position at the execution start time of the block based on an analysis result of the machining program analysis unit. The distance neighborhood determination unit determines whether the tool center point position at the execution start time of the block is present in the preset neighboring point distance from the current tool center point position of the tool. The block execution start time tool attitude acquisition unit acquires a tool attitude of the tool at the execution start time of the block based on the analysis result of the machining program analysis unit when the distance neighborhood determination unit determines presence in the neighboring point distance. The attitude neighborhood determination unit determines whether the difference between the tool attitude of the tool at the execution start time of the block and the current tool attitude of the tool is equal to or smaller than a preset value. The neighboring point output unit outputs the tool center point position at the execution start time of the block as the neighboring point when the attitude neighborhood determination unit determines that the difference is equal to or smaller than the preset value. The numerical controller further reads blocks from the machining program sequentially and analyzes the read blocks until the neighboring point output unit outputs the neighboring point or the machining program is ended.

The tool attitude may be defined by an angle of the rotation axis and the attitude neighborhood determination unit may determine whether the difference between an angle of the rotation axis at the execution start time of the block and the current angle of the rotation axis is equal to or smaller than a preset value.

A position instructed to the moving axis for moving a tip point of the tool to the tool center point position with the tool attitude is defined as a control point.

The tool attitude may be defined by a tool vector being a vector from a control point of the tool to a tool center point. The attitude neighborhood determination unit may determine whether an angle formed by a tool vector at the execution start time of the block and a current tool vector is equal to or smaller than a preset value.

According to the present invention, in machining with a plurality of block start points present within the range of a neighboring point distance, an unintended block start point is prevented from being searched as a neighboring point, whereby a more suitable block start point can be set to the neighboring point.

BRIEF DESCRIPTION OF THE DRAWINGS

These and other objects and features of the present invention will become apparent from the following description of exemplary embodiments with reference to the accompanying drawings in which:

FIG. 1 is a block diagram of main units of a numerical controller according to an embodiment of the present invention.

FIGS. 2A and 2B are diagrams illustrating the outline of neighboring point search processing according to a first embodiment of the present invention.

DETAILED DESCRIPTION OF THE PREFERRED EMBODIMENTS

Figure 2A:
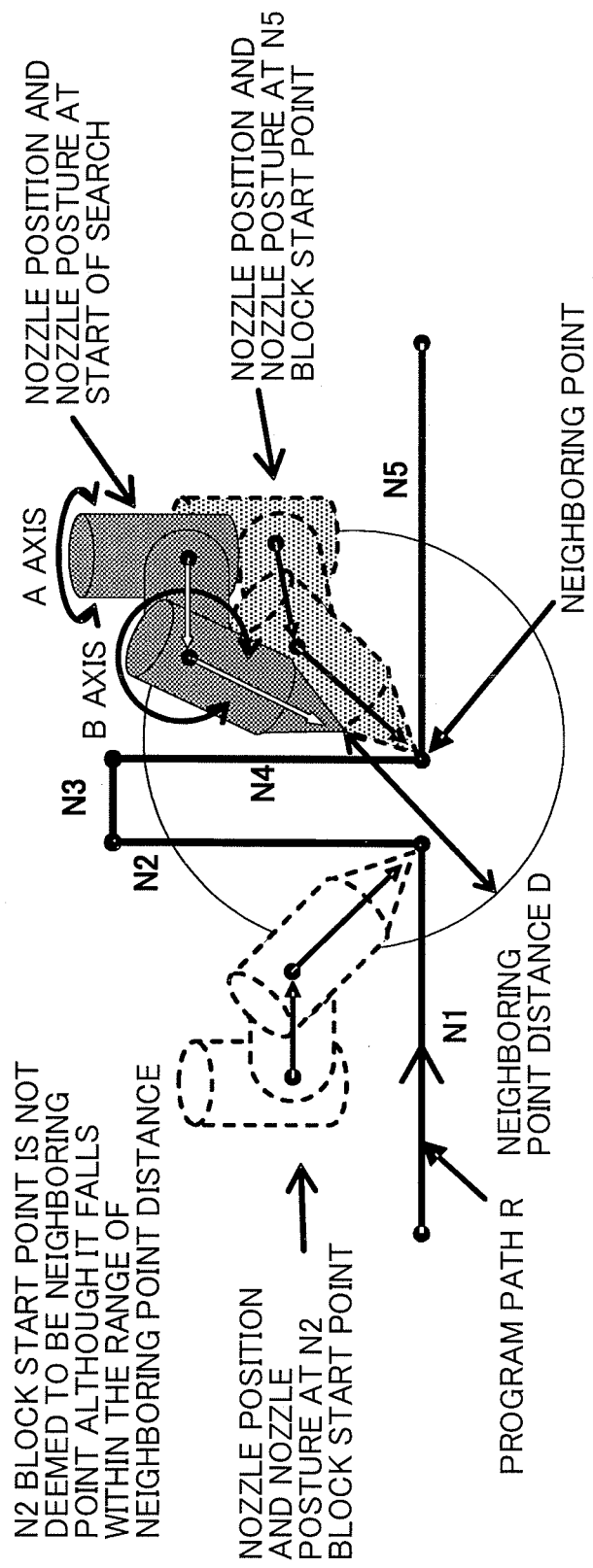

A neighboring point search function according to the present invention enables more accurate search and restart of a neighboring point by including not only a conventional determination of a neighboring point but also a determination using an attitude of a tool. More specifically, a determination of a neighboring point is performed by comparing a current attitude of a tool and an attitude of the tool at each of block start points of blocks under search.

In the present invention, a functional means as described below is implemented, whereby a neighboring point search function with consideration for an attitude of a tool is realized.

Means 1

When a block start point that enters within the range of a neighboring point distance from a tool center point is found, the difference between an angle of a rotation axis at that block start point and a current angle of the rotation axis is calculated. As a result of the calculation, when the angle difference between the rotation axes is not in a set range, the block start point is not defined as a neighboring point and the next block is searched successively.

Means 2

When a block start point that enters within the range of a neighboring point distance from a tool center point is found, an angle formed by a vector from the control point to the tool center point at the block start point and a vector from the control point to the tool center point at the current time is calculated. As a result of the calculation, when the angle is not in a set range, the block start point is not defined as a neighboring point and the next block is searched successively.

First Embodiment

In a first embodiment, a numerical controller including a neighboring point search function that uses the above-described means 1 will be described.

FIG. 1 is a block diagram of main units of a numerical controller 1 according to an embodiment of the present invention. A CPU 11 is a processor that performs overall control of the numerical controller 1. The CPU 11 reads a system program stored in a ROM 12 via a bus 20 and performs overall control of the numerical controller in accordance with the read system program. In RAM 13, temporal calculation data and display data as well as various data input by an operator via a display device/MDI unit 70 is stored.

A SRAM 14 is backed up by a battery which is not illustrated and configured as a non-volatile memory the memory state of which is held even if the power supply of the numerical controller 1 is turned off. In the SRAM 14, data such as a machining program read via an interface 15 and a machining program input via the display device/MDI unit 70 is stored. In a ROM 12, various system programs for performing processing in an editing mode required for creation and editing of machining programs and processing for an automatic operation are written in advance.

Various machining programs such as a machining program for performing the present invention can be input via the interface 15 and the display device/MDI unit 70 and stored in the SRAM 14.

The interface 15 enables connection between the numerical controller 1 and an external device 72 such as an adaptor. From the side of the external device 72, information such as a machining program and various parameters is read. A machining program edited within the numerical controller 1 can be stored in an external storage means via the external device 72. A programmable machine controller (PMC) 16 controls an auxiliary device of a machine tool (for example, an actuator such as a robot hand for tool exchange) by outputting a signal thereto via an I/O unit 17 using a sequence program equipped in the numerical controller 1. The PMC 16 further receives a signal from various switches on an operation panel provided on the body of the machine tool, for example, and forwards the received signal to the CPU 11 after performing necessary signal processing thereon.

The display device/MDI unit 70 is a manual data input device including a display, a keyboard, and the like. An interface 18 receives an instruction and data from the keyboard of the display device/MDI unit 70 and forwards the received instruction and data to the CPU 11. The interface 19 is connected to an operation panel 71 including a manual pulse generator and the like.

Axis control circuits 30 to 34 of each axis receive an instructed move amount from the CPU 11 and outputs an instruction for the axis to servo amplifier 40 to 44. The servo amplifier 40 to 44 receives the instruction to drive servo motors 50 to 54 for the axis. The servo motors 50 to 54 for each axis has a position and speed detector equipped therein and feeds back a position and speed feedback signal from this position and speed detector to the axis control circuit 30 to 34 to perform feedback control of a position and a speed. In the block diagram in FIG. 1, the position and speed feedback is omitted.

In the description of the present embodiment, a numerical controller is described as an example, that includes a nozzle for laser machining as a tool and controls a machine tool including three moving axes of an X axis, a Y axis, and a Z axis and two rotation axes of a first rotation axis (A axis) and a second rotation axis (B axis) as axes for driving the nozzle, as illustrated in FIG. 1.

The neighboring point search function in the present embodiment finds a block start point that enters within the range of a neighboring point distance from a current nozzle tip point. When a block end point of that block moves away from the nozzle tip point from that block start point, the angle differences between the first rotation axis and the second rotation axis at the block start point (a nozzle attitude at the block start point) and the current first rotation axis and the current second rotation axis (a current nozzle attitude) are calculated.

When each of the angle differences of the rotation axes is not in a predetermined range set in advance, the block start point is not defined as a neighboring point and the next block is searched successively.

FIGS. 2A and 2B are diagrams illustrating the outline of neighboring point search processing using the neighboring point search function in the present embodiment. In FIG. 2A, a program path R is a path at a nozzle tip point instructed from blocks N1 to N5 included in a machining program instruction.

When a machining program is temporarily executed (analyzed) from the start thereof with this neighboring point search function, it is determined that the nozzle tip point first enters within the range of a neighboring point distance D preset in the numerical controller at an N2 block start point and an N2 block end point moves away from the start point. The angle differences between the first rotation axis (A axis) and the second rotation axis (B axis) at the N2 block start point (the position of the nozzle tip point at the start of the N2 block) and the first rotation axis (A axis) and the second rotation axis (B axis) at a current nozzle position (the position of the nozzle at the start of the search) are calculated.

When the difference A1 between an angle of the first rotation axis (A axis) at the start of the N2 block and a current angle of the first rotation axis (A axis), and the difference B1 between an angle of the second rotation axis (B axis) at the start of the N2 block and a current angle of the second rotation axis (B axis) are calculated, next, the angle differences are compared with rotation axis neighboring angles preset in the numerical controller for each rotation axis (a first rotation axis neighboring angle $\theta 1$, a second rotation axis neighboring angle $\theta 2$).

As illustrated in FIG. 2B, each of the angle differences of the rotation axes (A1, B1) is large, and A1>$\theta 1$ and A2>$\theta 2$ are established. The N2 block start point is not defined as a neighboring point, and the neighboring point search is continued.

Next, when the neighboring point search is continued, an N5 block start point enters in the neighboring point distance D, and it is determined that an N5 block end point moves away from the start point. The angle differences between the first rotation axis (A axis) and the second rotation axis (B axis) at the N5 block start point (the position of the nozzle tip point at the start of the N5 block) and the first rotation axis (A axis) and the second rotation axis (B axis) at the current nozzle position (the position of the nozzle at the start of the search) are calculated.

When the difference A2 between an angle of the first rotation axis (A axis) at the start point of the N5 block and a current angle of the first rotation axis (A axis), and the difference B2 between an angle of the second rotation axis (B axis) at the start point of the N5 block and a current angle of the second rotation axis (B axis) are calculated, next, the angle differences are compared with the first rotation axis neighboring angle $\theta 1$ and the second rotation axis neighboring angle $\theta 2$.

As illustrated in FIG. 2B, each of the angle differences of the rotation axes (A2, B2) is small, and A2≤$\theta 1$ and B2:≤$\theta 2$ are established. The position of the nozzle tip point at the start of the N5 block is output as a result of the neighboring point search, and the moving axes are controlled to move the nozzle tip point to the output neighboring point.

Figure 3:
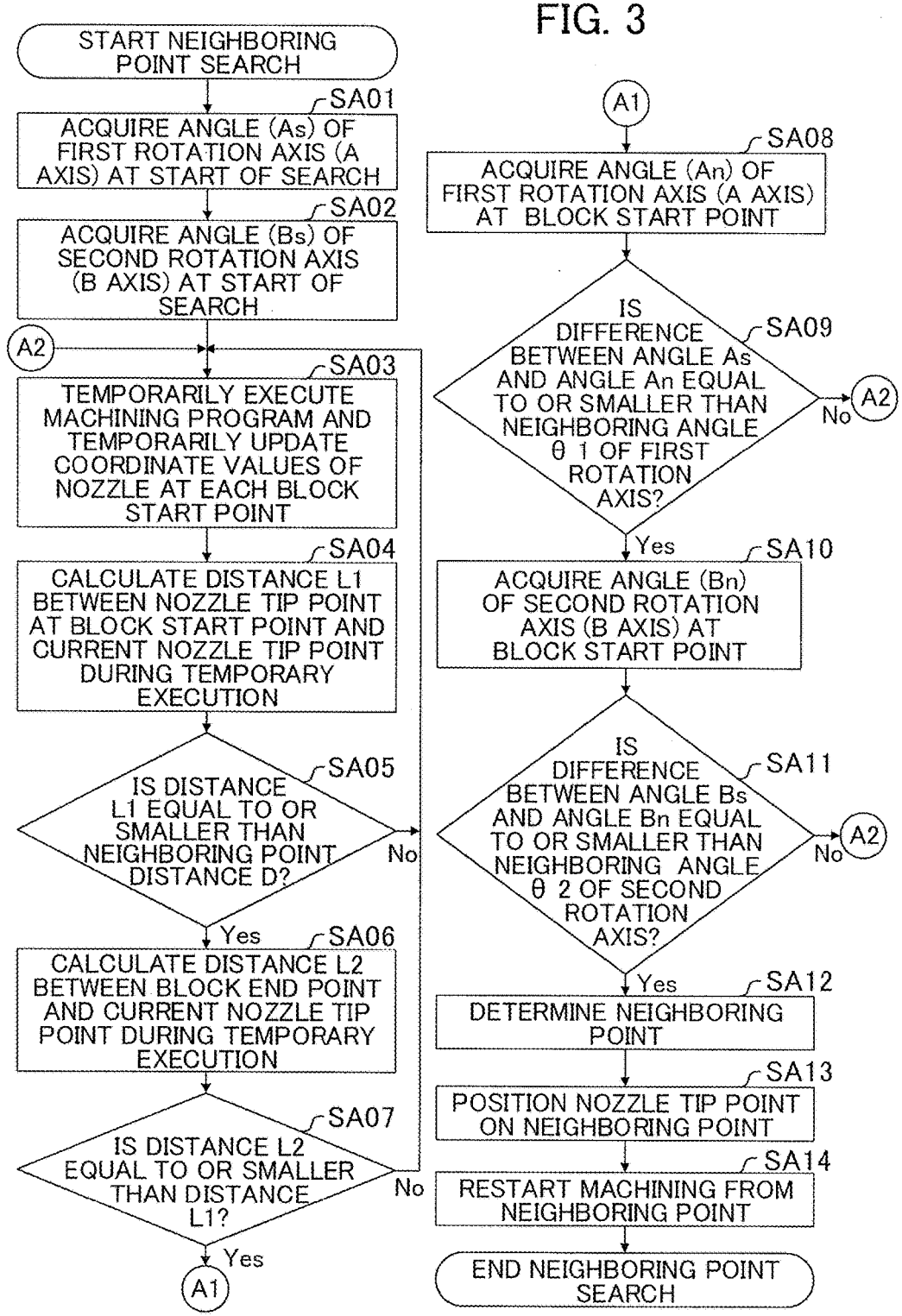
FIG. 3 is a flowchart of the neighboring point search processing according to the first embodiment of the present invention.

FIG. 3 is a flowchart of the neighboring point search processing according to the present embodiment.

[Step SA01] An angle As of the first rotation axis (A axis) at the start of the search is acquired.

[Step SA02] An angle Bs of the second rotation axis (B axis) at the start of the search is acquired.

[Step SA03] The machining program is read and blocks are temporarily executed (analyzed) sequentially. Coordinate values of the nozzle at the start of each block (coordinate values of the control point position and the tip point position of the nozzle and angles of the first rotation axis (A axis) and the second rotation axis (B axis)) are temporarily updated.

[Step SA04] A distance L1 between the position of the nozzle tip point at the start of the block and the current position of the nozzle tip point during the temporary execution (analysis) is calculated.

[Step SA05] Whether or not the distance L1 calculated at Step SA04 is equal to or smaller than the neighboring point distance D is determined. When the distance L1 is equal to or smaller than the neighboring point distance D, the processing proceeds to Step SA06. When the distance L1 is not equal to or smaller than the neighboring point distance D, it is determined that the position at the start of the current block is not the neighboring point, and the processing returns to Step SA03 to proceed to the next block.

[Step SA06] A distance L2 between the position of the nozzle tip point at the end point of the block and the current position of the nozzle tip point during the temporary execution (analysis) is calculated.

[Step SA07] Whether or not the distance L2 calculated at Step SA06 is larger than the distance L1 calculated at Step SA04 is determined. When the distance L2 is larger than the distance L1, the processing proceeds to Step SA08. When the distance L2 is not larger than the distance L1, it is determined that the position at the start of the current block is not the neighboring point, and the processing returns to Step SA03 to proceed to the next block.

[Step SA08] An angle An of the first rotation axis (A axis) at the start of the block is acquired.

[Step SA09] The difference between the angle As of the first rotation axis (A axis) at the start of the search and the angle An of the first rotation axis (A axis) at the start of the block is calculated. Whether or not the calculated difference is equal to or smaller than the neighboring angle $\theta 1$ of the first rotation axis is determined. When the calculated difference is equal to or smaller than the neighboring angle θ1 of the first rotation axis, the processing proceeds to Step SA10. When the calculated difference is not equal to or smaller than the neighboring angle θ1, it is determined that the position at the start of the current block is not the neighboring point, and the processing returns to Step SA03 to proceed to the next block.

[Step SA10] An angle Bn of the second rotation axis (B axis) at the start of the block is acquired.

[Step SA11] The difference between the angle Bs of the second rotation axis (B axis) at the start of the search and the angle Bn of the second rotation axis (B axis) at the start of the block is calculated. Whether or not the calculated difference is equal to or smaller than the neighboring angle θ2 of the second rotation axis is determined. When the calculated difference is equal to or smaller than the neighboring angle θ2 of the second rotation axis, the processing proceeds to Step SA12. When the calculated difference is not equal to or smaller than the neighboring angle θ2, it is determined that the position at the start of the current block is not the neighboring point, and the processing returns to Step SA03 to proceed to the next block.

[Step SA12] The position at the start of the block during the temporary execution (analysis) is determined as the neighboring point.

[Step SA13] The nozzle tip point is positioned on the neighboring point determined at Step SA12.

[Step SA14] The machining is restarted from the neighboring point.

As described above, the neighboring point search function according to the present embodiment determines a point, where the position of the nozzle tip point and the rotation angle of the nozzle at the execution start time of the neighboring point search processing and the position of the nozzle tip point and the rotation angle of the nozzle at the start of each block included in the machining program are within a certain neighborhood range, as a neighboring point.

In the present embodiment, the neighboring point search function is described taking a numerical controller as an example that controls a machine tool including three moving axes and two rotation axes. However, the neighboring point search function according to the present invention is not limited thereto and may be applied to a numerical controller that controls a machine tool including at least one or more moving axes and one or more rotation axes. Furthermore, a nozzle for laser machining has been described as an example of a tool. However, the present embodiment may be applied to any kinds of tool used in machining requiring control of tool attitudes such as cutting tool and grinding tool.

Second Embodiment

In the first embodiment, a neighboring point search function has been described, that determines a point, where the position of the tool center point and the rotation angle of the tool at the execution start time of the neighboring point search processing and the position of the tool center point and the rotation angle of the tool at the start of each block included in a machining program are within a certain neighborhood range, as a neighboring point. In a second embodiment, an example will be described in which the direction of a tool (a vector from the control point of the tool to the tool center point) is used instead of the rotation angle of the tool to determine a neighboring point. In the description of the present embodiment, a numerical controller that controls the same machine tool as in the first embodiment is described as an example.

With the neighboring point search function according to the present embodiment, when a block start point that enters within the range of a neighboring point distance from a nozzle tip point is found, an angle formed by a vector from the control point of the nozzle to the nozzle tip point at the block start point and a vector from the control point of the nozzle to the nozzle tip point at the current time is calculated. When this angle is not in a predetermined range set in advance, the block start point is not defined as a neighboring point and the next block is searched successively.

Figure 4A:
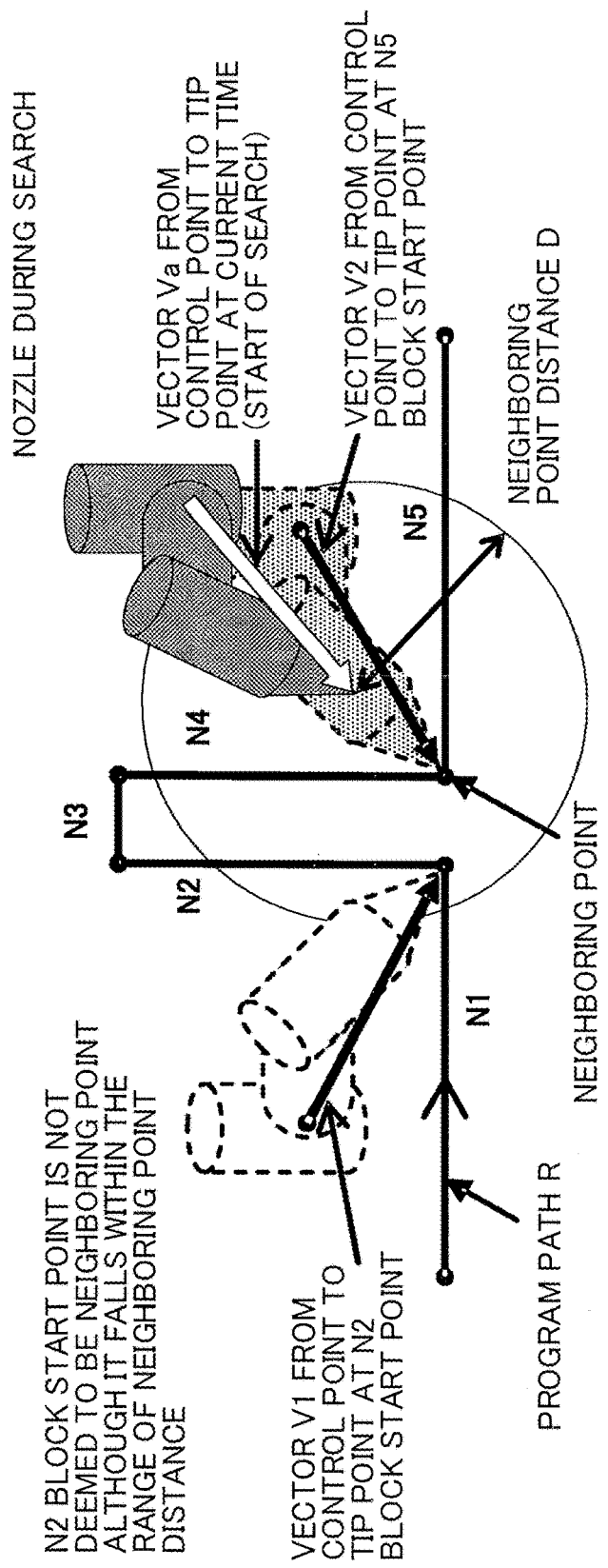
FIGS. 4A and 4B are diagrams illustrating the outline of neighboring point search processing according to a second embodiment of the present invention.
Figure 4B:
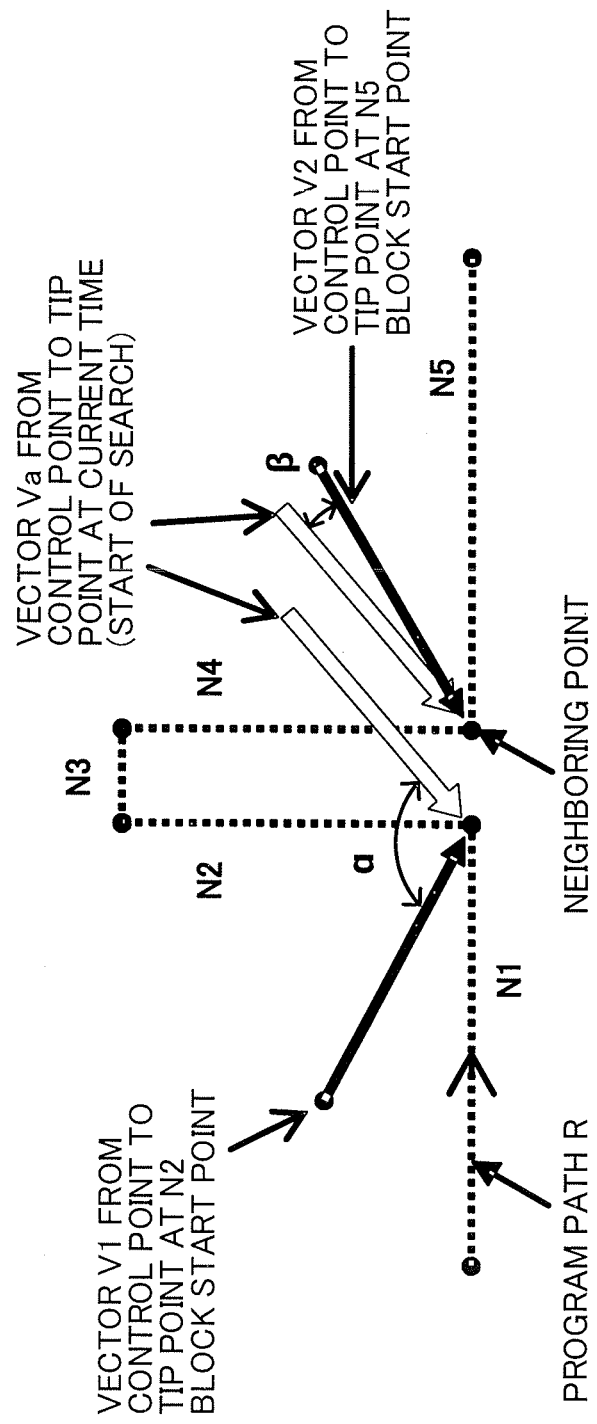

FIGS. 4A and 4B are diagrams illustrating the outline of neighboring point search processing using the neighboring point search function according to the present embodiment. In FIG. 4A, a program path R is a path at a nozzle tip point instructed from blocks N1 to N5 included in a machining program instruction.

When a machining program is temporarily executed (analyzed) from the start thereof with the neighboring point search function according to the present embodiment, it is determined that the nozzle tip point first enters within the range of a neighboring point distance D preset in the numerical controller at a N2 block start point. A vector V1 from the control point of the nozzle to the nozzle tip point at the N2 block start point (the position of the nozzle tip point at the start of the N2 block) and a vector Va from the control point of the nozzle to the nozzle tip point at the current nozzle position (the position of the nozzle at the start of the search) are calculated. The angle formed by the vector V1 and the vector Va is then calculated.

When an angle α is calculated that is formed by the vector V1 from the control point of the nozzle to the nozzle tip point at the N2 block start point and the vector Va from the control point of the nozzle to the nozzle tip point at the start of the search, the angle α is compared with a neighboring vector angle φ preset in the numerical controller.

As illustrated in FIG. 4B, because the angle α formed by the vector V1 and Va is large and α>φ is established, the N2 block start point is not defined as a neighboring point and the neighboring point search is continued.

Next, when the neighboring point search is continued, it is determined that an N5 block start point enters in the neighboring point distance D. A vector V2 from the control point of the nozzle to the nozzle tip point at the N5 block start point (the position of the nozzle tip point at the start of the N5 block) is calculated. The angle formed by the vector V2 and the vector Va is then calculated.

When an angle β is calculated that is formed by the vector V2 from the control point of the nozzle to the nozzle tip point at the N5 block start point and the vector Va from the control point of the nozzle to the nozzle tip point at the start of the search, the angle β is compared with the neighboring vector angle φ preset in the numerical controller.

As illustrated in FIG. 4B, because the angle β formed by the vector V2 and Va is small and β≤φ is established, the position of the nozzle tip point at the start of the N5 block is output as a result of the neighboring point search, and the moving axes are controlled to move the nozzle tip point to the output neighboring point.

Figure 5:
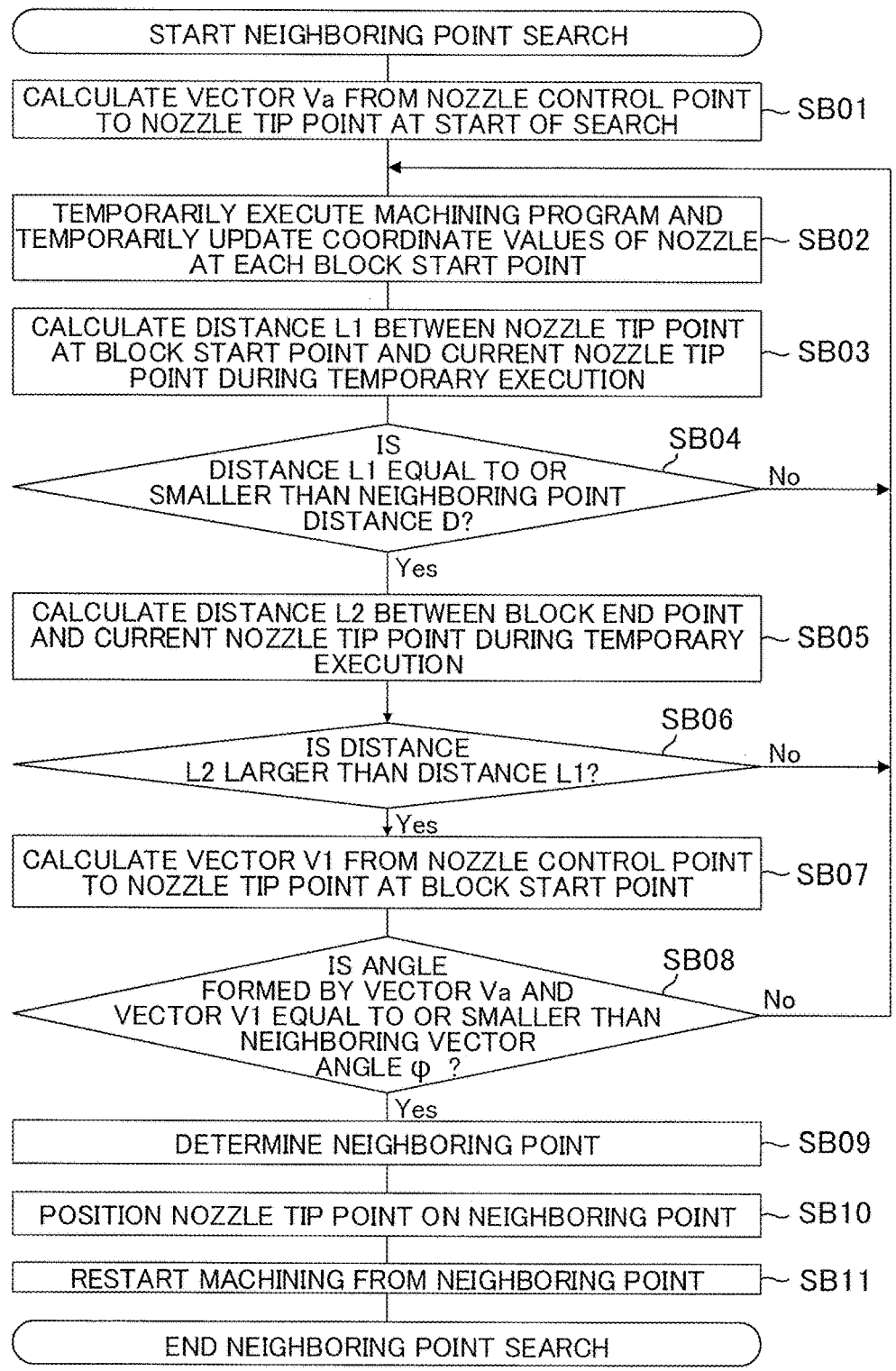
FIG. 5 is a flowchart of the neighboring point search processing according to the second embodiment of the present invention.
Figure 6:
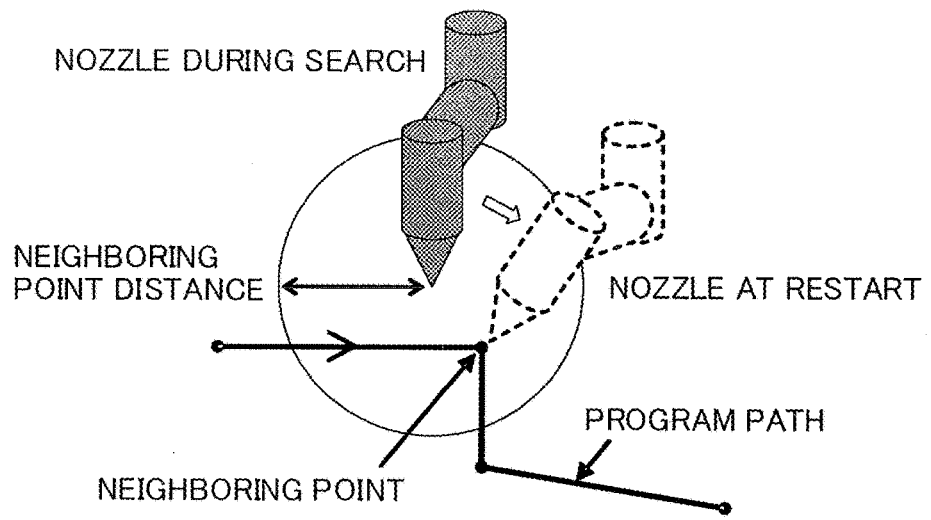
FIG. 6 is a diagram illustrating a neighboring point search function according to a prior art technique.
Figure 7:
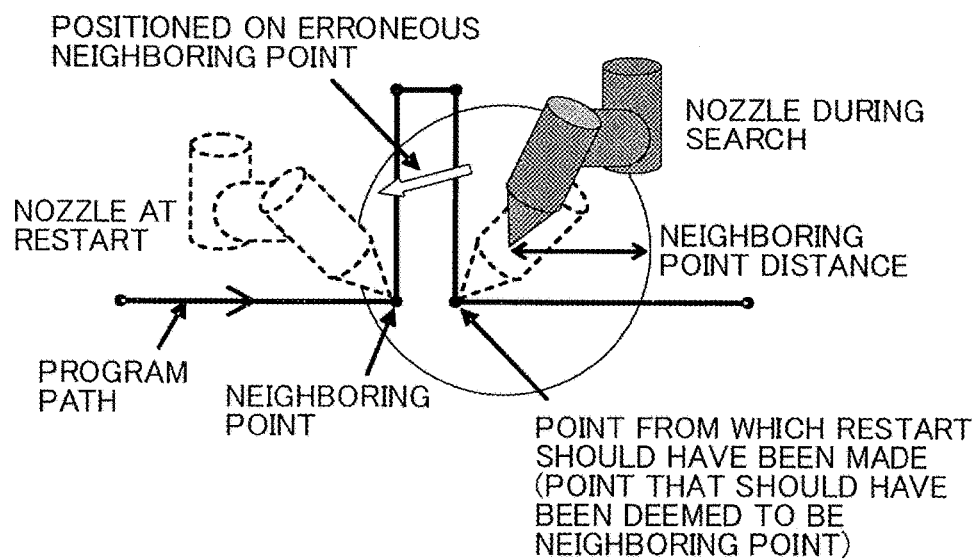
FIG. 7 is a diagram illustrating a problem with the neighboring point search function according to the prior art technique.

FIG. 5 is a flowchart of the neighboring point search processing according to the present embodiment.

[Step SB01] Coordinate values of the nozzle at the start of the search (coordinate values of the nozzle tip point position, angles of the first rotation axis (A axis) and the second rotation axis (B axis), and other information)

are acquired. Based on the acquired coordinate values, the vector Va from the control point of the nozzle to the nozzle tip point at the start of the search is calculated.

[Step SB02] The machining program is read and the blocks are temporarily executed (analyzed) sequentially. Coordinate values of the nozzle at the start of each block is temporarily updated.

[Step SB03] A distance L1 between the tip point position of the nozzle at the start of the block and the current position of the nozzle tip point during the temporary execution (analysis) is calculated.

[Step SB04] Whether or not the distance L1 calculated at Step SB03 is equal to or smaller than the neighboring point distance D is determined. When the distance L1 is equal to or smaller than the neighboring point distance D, the processing proceeds to Step SB05. When the distance L1 is not equal to or smaller than the neighboring point distance D, it is determined that the position at the start of the current block is not the neighboring point, and the processing returns to Step SB02 to proceed to the next block.

[Step SB05] A distance L2 between the position of the nozzle tip point at the end point of the block and the current position of the nozzle tip point during temporary execution (analysis) is calculated.

[Step SB06] Whether or not the distance L2 calculated at Step SB05 is larger than the distance L1 calculated at Step SB03 is determined. When the distance L2 is larger than the distance L1, the processing proceeds to Step SB07. When the distance L2 is not larger than the distance L1, it is determined that the position at the start of the current block is not the neighboring point, and the processing returns to Step SB02 to proceed to the next block.

[Step SB07] A vector V1 from the control point of the nozzle to the nozzle tip point at the start of the block is calculated.

[Step SB08] The angle formed by the vector Va from the control point of the nozzle to the nozzle tip point at the start of the search and the vector V1 from the control point of the nozzle to the nozzle tip point at the start of the block is calculated. Whether or not the calculated angle is equal to or smaller than the neighboring vector angle $\phi$ is determined. When the calculated angle is equal to or smaller than the neighboring vector angle $\phi$, the processing proceeds to Step SB09. When the calculated angle is not equal to or smaller than the neighboring vector angle $\phi$, it is determined that the position at the start of the current block is not the neighboring point, and the processing returns to Step SB02 to proceed to the next block.

[Step SB09] The position at the start of the block during temporary execution (analysis) is determined as the neighboring point.

[Step SB10] The nozzle tip point is positioned on the neighboring point determined at Step SB09.

[Step SB11] The machining is restarted from the neighboring point.

As described above, the neighboring point search function according to the present embodiment determines a point, where the nozzle tip point position and the vector from the control position of the nozzle to the nozzle tip point at the execution start time of the neighboring point search processing, and the nozzle tip point position and the vector from the control point of the nozzle to the nozzle tip point at the start of each block included in the machining program are present within a certain neighborhood range, as a neighboring point.

The invention claimed is:

1. A numerical controller which controls movement of at least one moving axis and at least one rotation axis of a machine tool based on a machining program, the numerical controller comprising:
   a current tool center point position acquisition unit that acquires, based on a feedback signal from a position detector associated with the at least one moving axis and the at least one rotation axis, a current tool center point position of the tool;
   a current tool attitude acquisition unit that acquires a current tool attitude of the tool;
   a machining program analysis unit that reads a block from the machining program and analyzes the read block;
   a block execution start time tool center point position acquisition unit that acquires a tool center point position at the execution start time of the block based on an analysis result of the machining program analysis unit;
   a distance neighborhood determination unit that determines whether the tool center point position at the execution start time of the block is (i) present in a preset neighboring point distance from the current tool center point position of the tool and (ii) on a machining path directed by the machining program;
   a block execution start time tool attitude acquisition unit that acquires a tool attitude of the tool at the execution start time of the block based on the analysis result of the machining program analysis unit when the distance neighborhood determination unit determines that the tool center point position at the execution start time of the block is present in the neighboring point distance;
   an attitude neighborhood determination unit that determines whether the difference between the tool attitude of the tool at the execution start time of the block and the current tool attitude of the tool is equal to or smaller than a preset value; and
   a neighboring point output unit that outputs the tool center point position at the execution start time of the block as a neighboring point when the attitude neighborhood determination unit determines that the difference is equal to or smaller than the preset value, wherein
   the numerical controller controls the at least one moving axis and the at least one rotation axis to move the tool to the output neighboring point, and restarts the machining program from the output neighboring point.

2. The numerical controller according to claim 1, wherein the tool attitude is defined by an angle of the at least one rotation axis and the attitude neighborhood determination unit determines whether the difference between an angle of the at least one rotation axis at the execution start time of the block and the current angle of the at least one rotation axis is equal to or smaller than a preset value.

3. The numerical controller according to claim 1, wherein the tool attitude is defined by a tool vector being a vector from a control point of the tool to a tool center point and the attitude neighborhood determination unit determines whether an angle formed by a tool vector at the execution start time of the block and a current tool vector is equal to or smaller than a preset value.

* * * * *